Aug. 15, 1961
C. J. PLANK ET AL
2,996,448
MANUFACTURE OF A SILICA-HAFNIA CATALYST
FOR CONVERSION OF HYDROCARBONS
Filed Dec. 7, 1959
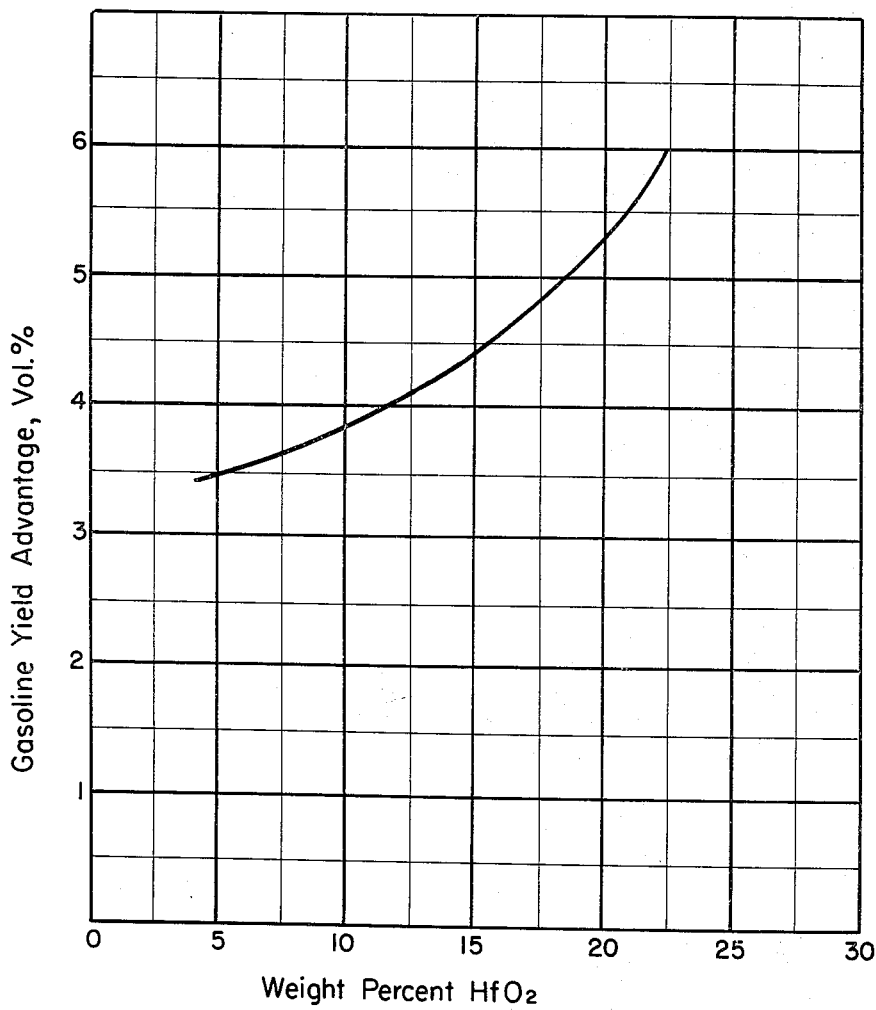
INVENTORS:
Charles J. Plank
BY   Edward J. Rosinski
ATTORNEY 2,996,448
MANUFACTURE OF A SILICA-HAFNIA CATALYST FOR CONVERSION OF HYDROCARBONS
Charles J. Plank, Woodbury, and Edward J. Rosinski, Almonesson, N.J., assignors to Socony Mobil Oil Company, Inc., a corporation of New York
Filed Dec. 7, 1959, Ser. No. 857,713
12 Claims. (Cl. 208—119)

This invention relates to the catalytic conversion of hydrocarbons and to an improved catalyst for effecting said conversion. More particularly, the invention relates to the catalytic cracking of hydrocarbon oils in the presence of a new and improved catalyst. In one embodiment, this invention is concerned with an improved silica-hafnia cracking catalyst characterized by unusual selectivity in the conversion of hydrocarbons. In another embodiment, the invention is directed to an improved method for preparing silica-hafnia composites of such characteristics useful in catalytic cracking of heavy petroleum fractions to lighter materials boiling in the gasoline range.

As is well known, there are numerous materials, both of natural and synthetic origin which have the ability to catalyze the cracking of hydrocarbons. However, the mere ability to catalyze cracking is far from sufficient to afford a catalyst of commercial significance. Of the presently commercially available cracking catalysts, a synthetic silica-alumina composite catalyst is by far the most widely used. While such type catalyst is superior in many ways to the earlier employed clay catalysts and is fairly satisfactory it is subject to improvement, particularly as regard to the selectivity desirable in a modern cracking catalyst.

The present invention affords a commercially attractive silica-hafnia catalyst characterized by outstanding selectivity in the conversion of hydrocarbons. The improvement arises from the method of manufacture which comprises a particular combination of procedural steps including the reaction of a water-soluble hafnium compound and a silicate in such proportions as to yield a gelable hydrosol having a hafnia content, on a dry basis, of between about 1 and about 30 percent by weight and a pH in excess of 6, permitting the resulting sol to set forming a silica-hafnia gel, reducing the pH of said gel to below 5 and activating the same by maintaining the gel under such conditions of reduced pH while in contact with an aqueous medium at a temperature in the approximate range of 150 to 220° F. for at least about 1 hour under conditions of substantially atmospheric pressure.

After activation in aqueous medium, zeolitic impurities, if any, are removed from the gel and the latter is washed free of water-soluble matter, dried and calcined. In the foregoing procedure, it has been found that the activation step of treating the silica-hafnia gel in an aqueous medium at the specified conditions and the control of pH during gelation and such activation step are essential in achieving the unusually effective selectivity characterizing the present silica-hafnia catalyst. It has further been found, in accordance with the present invention, that not only is the activation step essential, but that also the conditions required during this step to obtain the desired catalyst selectivity are very critical. Thus, the pH during the activation step is essentially below 5 and preferably below 3.5. The pH of gel formation, on the other hand, is essentially above 6 permitting the attainment of silica-hafnia gels characterized by particularly favorable gel properties as well as by a short time of set, i.e. generally less than 2 hours and more particularly less than 20 seconds. Hydrogels prepared at a pH above 6 are much more susceptible to activation than those prepared below 6 pH. The temperature of the activation treatment involving the use of an aqueous medium is above about 150° F. and preferably above 175° F. and generally does not exceed 220° F. The time required for activation is generally at least 1 hour and may extend up to 72 hours or longer. Preferably, the activation period is at least 2 hours and usually within the approximate range of 2 to 48 hours.

The intermediate hydrogel state obtained in preparation of present catalysts is to be distinguished from a gelatinous precipitate. True all-embracing hydrogels occupy the entire volume of the solution from which they are formed and possess a definitely rigid structure. When fractured, a true hydrogel shows a conchoidal fracture as compared to an irregular ragged edge fraction as obtained in the case of gelatinous precipitates. The latter occupy only a part of the volume of the solution from which they are formed and have no rigidity of structure. In addition, hydrogels can generally be more easily washed free of soluble impurities due to the tendency of gelatinous precipitates to peptize on washing. A distinct and further advantage of hydrogels is that due to their rigid structure, they can be formed into high quality spheroidal particles.

The hafnium compound employed in the present process is a water-soluble compound and suitably a water-soluble mineral acid salt of hafnium such as for example, hafnium nitrate, hafnium sulfate and hafnium oxychloride. Of this group, hafnium sulfate is accorded preference. This compound is readily prepared by dissolving pure hafnium oxide in sulfuric acid.

The silicate reactant is generally an alkali metal silicate and particularly sodium silicate, although silicates of the other alkali metals, such as, for example, potassium silicate might likewise be employed. An organic silicate ester, for example ethyl ortho silicate, may also be employed, as the source of silica.

The solutions of zirconium compound and silicate reactant are intimately mixed in such proportions as to yield a gelable sol having a hafnia content, on a dry basis, of between about 1 and about 30 and preferably between about 2 and about 25 percent by weight and a pH of above 6 and generally not exceeding about 11. Preferably, the pH of the hydrosol is within the approximate range of 6.5 to 9.5.

The resulting product is a hydrosol of silica and hafnia characterized by an inherent capacity to set to a hydrogel upon lapse of a suitable interval of time, extending from a few seconds up to several hours depending on pH, temperature and solids concentration, without addition to or subtraction from the hydrosol of any substance. By following the teachings of this invention, the time of gelation can be very rapid, i.e. less than 20 seconds which permits the gel to be prepared directly in the form of spheroidal particles resulting in a product of improved physical properties and in definite economic advantages in the manufacture of the catalyst. In addition to affording rapid gelation, the high pH of gel formation has been found to give rise to a more selective catalyst as compared with a comparable gel in which the pH of formation is below 6.

The silica-hafnia hydrogel so obtained, is thereafter treated to reduce the pH thereof to below 5 and preferably less than 3.5 but greater than 1. To accomplish such purpose, the hydrogel is contacted with an acidic fluid substantially immediately after formation. While the lapse of a short interval of time is permissible, it is generally desirable to reduce the pH of the silica-hafnia hydrogel immediately upon formation to less than 5. Maintaining the hydrogel under conditions of pH at which formation is effected for a considerable period of time was found to be detrimental to the selectivity of the finished catalyst. Generally, the hydrogel is contacted with an aqueous solution of an acid or an acidic salt of sufficient concentration to effectively reduce the hydrogel pH to less than 5. Usually, an inorganic acid and particularly a dilute solution of a mineral acid such as nitric, hydrochloric or sulfuric and in the form of a ½ to 10 weight percent solution is employed for this purpose. It is also permissible to use salt solutions which give a strongly acidic reaction. For example, solutions of salts of hafnium, zirconium or aluminum which do not adversely affect the resultant catalyst may be used.

The hydrogel of reduced pH is then activated by maintaining the same under the aforementioned conditions of reduced pH while in contact with an aqueous medium at a temperature in the approximate range of 150 to 220° F. and more particularly between about 175 and about 200° F. at substantially atmospheric pressure for at least 1 hour and generally not exceeding about 72 hours. This step is critical in achieving the improved silica-hafnia composite of this invention. In accordance with such step, the hydrogel is suitably covered with an acidic solution to maintain the pH of the hydrogel during activation within the approximate range of 1 to 5 and preferably 1 to 3.5. While the hydrogel, after treatment to reduce its pH of formation as described, may be transferred or conducted to an aqueous medium maintained at the elevated temperature specified hereinabove, it is generally preferred to effect activation of the hydrogel in the same solution used for reduction of pH. Thus, it is contemplated that in a preferred operation, the silica-hafnia hydrogel after formation at a pH in excess of 6 is conducted to an aqueous dilute solution of an acid or acid salt wherein the pH of the hydrogel is immediately brought to below 5 and the hydrogel is thereafter maintained in such solution at a temperature of between 150 and 220° F. for a sufficient period to accomplish the desired activation. The pH of the hydrogel during the activation treatment is an important factor having a direct bearing on the ultimate catalyst activity and in accordance with the process of this invention should be less than 5 and preferably below 3.5 in order to obtain a catalyst of high cracking activity.

After the activation treatment, exchangeable or zeolitic impurities, if present are removed from the hydrogel in any feasible manner. While as a practical matter, all or a large proportion of such zeolitic impurities may be removed during the course of the activation treatment with the aqueous medium containing an acidic compound, any remaining zeolitic matter is suitably removed by base-exchange with aqueous solution of mineral acids such as hydrochloric and sulfuric acids; solutions of ammonium salts which act to replace metal impurities with ammonium which is later removed by calcining; and solutions of multivalent metal salts; particularly a hafnium salt which may be the same or a different hafnium salt from that employed in initial formation of the hydrogel. When base-exchanging the silica-hafnia hydrogel with an acid, a limited and controlled amount must obviously be used to avoid redissolving the hafnia. When exchanging with ammonium compounds any excesses will be calcined out in the final steps of catalyst manufacture and when using any hafnium or other multivalent metal salt which does not adversely affect the catalytic properties, excesses may be used and left on the composite.

After removal of zeolitic impurities, the hydrogel is water washed free of soluble excess ions. The resulting catalytic composite of silica and hafnia is then completed by drying in air or superheated steam at a temperature between about 200 and 400° F. for a period of between about 4 and 24 hours and/or by calcining at a temperature between about 800 and about 1800° F. for approximately 2 to 8 hours or more.

The catalyst may be prepared in any desired mechanical form according to the specific purpose for which it is intended. Either before or after calcination, it can be broken into lumps or granules, or it can be ground to a fine powder adapted for use in the suspensoid or fluidized solids process. Alternatively, the catalyst can be formed into pills, pellets or other suitable shapes, preferably prior to the calcination step for use in fixed bed or compact moving bed operations. In this case, the catalytic mixture is partially dried, ground to a powder preferably smaller than 30 mesh (Tyler), combined with a suitable lubricant such as graphite, hydrogenated coconut oil, stearic acid, rosin or the like and shaped by extrusion, molding or other means known in the art. Particles having dimensions ranging from about ⅛" x ⅛" to ½" x ½" are generally satisfactory. The shaped particles can then be further dried and/or calcined as described above.

In one embodiment of the invention, the initially prepared hydrosol is introduced in the form of globules to a water-immiscible liquid, for example, an oil medium wherein the globules of hydrosol set to spheroidal bead-like particles of hydrogel. Larger size spheres are ordinarily within the range of about ⅟₆₄ to about ½ inch in diameter whereas smaller size spheres which are generally referred to as microspheres are within the range of from about 10 to about 100 microns in diameter. The use of spherically shaped gel particles is of particular advantage in hydrocarbon conversion processes including the moving catalyst bed process, the fluidized process and other processes in which the spheroidal silica-hafnia catalyst particles are subjected to continuous movement. As applied to the stationary bed, spheroidal gel catalyst particles provide effective contact between the reactants and the catalyst by avoiding channeling.

The resulting improved silica-hafnia catalyst is useful in numerous processes for the conversion of hydrocarbons. It has been found, for example, to be highly effective in the cracking of heavy petroleum oils, such as gas oils, heavy naphthas and the like to lighter materials boiling in the gasoline range at conventional catalytic cracking conditions including temperatures in the range of about 800° F. to 1050° F. and pressure ordinarily between 1 and 5 atmospheres absolute. The present catalyst is also suitable for use in various other hydrocarbon conversion reactions. Thus, it is contemplated that the silica-hafnia composite may be effectively used as a base for a hydrocracking catalyst when combined with dehydrogenation components such as platinum, palladium, molybdena, cobalt oxide-molybdenum oxide, tungsten and the like.

The following examples will serve to illustrate the invention hereinabove described without limiting the same:

EXAMPLE 1

A silica-hafnia catalyst was produced from the following reactants:

Solution A which consisted of 2952 cc. of diluted "N" brand sodium silicate containing 0.193 gram $SiO_2$/cc.

Solution B which was prepared by adding 600 cc. of $Hf(SO_4)_2 \cdot H_2SO_4$ solution containing 0.05 gram $HfO_2$/cc. and 136 cc. of $H_2SO_4$ (50 weight percent aqueous solution) to 6312 cc. of water.

To Solution A, cooled to 40° F., was added Solution B, cooled to 33° F., while agitating vigorously. The resulting 8.5 pH sol containing 6.6 percent weight $HfO_2$, on a finished basis, formed a firm gel in 15 seconds.

The resulting gel was cut into cubes and covered with a 1 weight percent aqueous sulfuric acid solution, using 4000 cc. of acid for 5000 cc. of gel. The gel was maintained at 200° F. in the above solution for 24 hours, reducing the gel pH to 2.7. The hot acid-activated gel was then exchanged with a 2 percent $NH_4Cl$ solution for a total of 4 changes, one extending overnight for a period of about 18 hours and three 2-hour changes, using 1 volume of solution per volume of gel.

The base-exchanged hydrogel was then water washed continuously until clear of chloride ions. The washed gel was then dried at 270° F. for 20 hours in an air atmosphere and calcined 10 hours at 1000° F. in air.

EXAMPLE 2

A silica-hafnia catalyst was produced from the following reactants:

Solution A which consisted of 2800 cc. of diluted "N" brand sodium silicate containing 0.193 gram $SiO_2$/cc. and 136 cc. of dilute sodium hydroxide solution containing 0.25 gram NaOH/cc.

Solution B which consisted of 1200 cc. of $$Hf(SO_4)_2 \cdot H_2SO_4$$

solution containing 0.05 gram $HfO_2$/cc. and 5864 cc. of water.

To Solution A, cooled to 40° F., was added Solution B, cooled to 33° F., while agitating vigorously. The resulting hydrosol had a pH of 8.2 and contained 14 percent weight $HfO_2$ on a finished basis. Gelation to a firm hydrogel occurred in about 15 seconds.

The resulting gel was cut into cubes and processed as in Example 1.

EXAMPLE 3

This example was used to compare preparation methods by forming and activating the gel at 3.6 pH. The solutions used in this preparation were as follows:

Solution A which consisted of 2800 cc. of dilute "N" brand sodium silicate containing 0.193 gram $SiO_2$/cc.

Solution B which consisted of 1200 cc. of $$Hf(SO_4)_2 \cdot H_2SO_4$$

containing 0.05 gram $HfO_2$/cc., 7.2 cc. of $H_2SO_4$ (50 weight percent aqueous solution) and 6000 cc. of water.

To Solution B was added Solution A while agitating vigorously. The resulting hydrosol had a pH of 3.6 and required 4–5 hours to set to a firm gel. The gel, so obtained, was allowed to stand at room temperature overnight, cut into cubes and covered with water in which the gel was aged for 24 hours at 200° F.

The resulting gel was cut into cubes and processed as in Example 1.

EXAMPLE 4

A silica-hafnia catalyst was produced from the following reactants:

Solution A which consisted of 1852 cc. of dilute "N" brand sodium silicate solution containing 0.193 gram $SiO_2$/cc. and 448 cc. of dilute sodium hydroxide solution containing 0.25 gram NaOH/cc.

Solution B which consisted of 1260 cc. of $$Hf(SO_4)_2 \cdot H_2SO_4$$

containing 0.05 gram $HfO_2$/cc. and 5320 cc. of water.

To Solution B, cooled to 33° F. was added Solution A, cooled to 40° F., while agitating vigorously. The resulting hydrosol had a pH of 8.2 and contained 21 percent weight $HfO_2$ on a finished basis. Gelation to a firm hydrogel occurred in about 15 seconds.

The resulting gel was cut into cubes and processed as in Example 1.

Cracking characteristics of the above catalysts of Examples 1–4 were determined upon subjecting each of the catalysts to the CAT-C test. In this test, a wide-range Mid-Continent gas oil, boiling initially from 450° F. to 95 percent at 950° F. is passed over the catalyst sample at a standard set of conditions involving a liquid hourly space velocity of 2, a catalyst to oil ratio of 3 and a temperature of 900° F. To observe selectivity differences independent of the conversion level of the individual silica-hafnia catalyst samples, each catalyst is compared to a standard commercial silica-alumina cracking catalyst containing about 10 weight percent alumina and 90 weight percent silica, giving the same conversion as the appropriate silica-hafnia catalyst. The results for Examples 1–4 are set forth in the table. In this comparison, each of the catalysts were treated with 100 percent steam for 20 hours at atmospheric pressure at 1225° F. before the cracking test to bring the activity to a reproducible level.

*Table*

| Example | 1 | 2 | 3 | 4 |
|---|---|---|---|---|
| Description: | | | | |
| Forming pH | 8.5 | 8.2 | 3.6 | 8.2 |
| Gel Time | 15 sec. | 15 sec. | 4–5 hrs. | 15 sec. |
| Activation: | | | | |
| Solution | $H_2SO_4$ | $H_2SO_4$ | $H_2O$ | $H_2SO_4$ |
| Conc., Percent Wt | 1 | 1 | | 1 |
| Time, Hrs | 24 | 24 | 24 | 24 |
| Temp., °F | 200 | 200 | 200 | 200 |
| Final pH | 2.7 | 2.4 | 3.2 | 2.1 |
| Physical Properties: | | | | |
| Pore Vol., cc./g | 0.56 | 0.48 | | 0.38 |
| Density, g./cc.— | | | | |
| Particle | 1.01 | 1.12 | | 1.28 |
| Real | 2.33 | 2.42 | | 2.49 |
| Apparent: | | | | |
| Fresh | 0.60 | 0.63 | 0.73 | 0.66 |
| Steamed [1] | 0.66 | 0.73 | 0.86 | 0.88 |
| Surface Area, m.²/g.: | | | | |
| Fresh | 598 | 624 | 609 | 559 |
| Steamed [1] | 338 | 319 | 277 | 313 |
| Composition (analyzed): | | | | |
| $HfO_2$, percent wt | 6.6 | 14.0 | 14.0 | 21.0 |
| Na, percent wt | 0.06 | <0.05 | 0.07 | <0.03 |
| $SO_4$, percent wt | <0.09 | <0.09 | | 0.15 |

| CAT-C EVALUATION | | | | |
|---|---|---|---|---|
| Steamed Catalysts: [1] | | | | |
| Conversion, Vol. Percent | 43.3 | 54.4 | 53.6 | 51.1 |
| 10 RVP Gasoline, Vol. Percent | 39.8 | 47.1 | 44.8 | 46.5 |
| $C_5+$ Gasoline, Vol. Percent | 36.5 | 44.2 | 41.6 | 43.1 |
| Total $C_4$'s, Vol. Percent | 7.9 | 12.2 | 12.3 | 9.7 |
| Dry Gas, Wt. Percent | 4.9 | 5.6 | 6.4 | 5.0 |
| Coke, Wt. Percent | 1.6 | 2.5 | 2.9 | 2.4 |
| Difference from $SiO_2$–$Al_2O_3$: [2] | | | | |
| 10 RVP Gaso., Vol. Percent | +3.6 | +4.3 | +2.5 | +5.6 |
| $XsC_4$, Vol. Percent | −3.5 | −2.7 | −2.7 | −4.6 |
| Dry Gas, Wt. Percent | 0.0 | −1.0 | −0.12 | −1.1 |
| Coke, Wt. Percent | −0.44 | −1.0 | −0.47 | −0.6 |

[1] Steamed 20 hours at 1225° F. with steam at atmospheric pressure.
[2] Value for $SiO_2$–$HfO_2$ catalyst minus value for $SiO_2$–$Al_2O_3$ at the same conversion.

From the above data, it is evident that formation of the silica-hafnia hydrogel at the higher pH and subsequent reduction in pH during activation treatment has several advantages over comparable formation of the hydrogel initially at a low pH. Thus, comparing the results of Examples 2 and 3 which have an identical chemical composition, it will be seen that the gel time is considerably shortened in the case of Example 2 prepared initially at a high pH over that of Example 3 prepared at low pH. This permits production of the hydrogel in particulate form directly from the hydrosol without intermediate formation of a mass of gel which is subsequently broken up and formed into particles of suitable size and shape. Secondly, the activity of the catalysts, after steam treatment, i.e. the steam stability, is higher for the catalyst of Example 2 than the catalyst of Example 3. Thirdly, more gasoline and less coke is formed with the catalyst of Example 2 in comparison with that of Example 3.

Turning to the advantage of silica-hafnia over a commercial silica-alumina cracking catalyst at the same conversion, it will be seen that the catalyst of Example 1 afforded a +3.6 volume percent yield of gasoline; the catalyst of Example 2, a +4.3 volume percent yield of gasoline and 1.0 weight percent less coke and the catalyst of Example 4 a +5.6 volume percent yield of gasoline. While the catalyst of Example 3, prepared at an initially low pH of 3.6 afforded a +2.5 volume percent yield of gasoline more than that obtained by commercial silica-alumina catalyst at the same conversion, this amount of gasoline was 2.3 volume percent less than obtained with the catalyst of Example 2 which was formed at 8.5 pH and subsequently activated in said solution.

The effect of hafnia content on the cracking selectivity of the present catalyst is shown by a comparison of the results of Examples 1, 2 and 4. The data are presented graphically in the attached drawing wherein the gasoline yield advantage obtained over a commrecial silica-alumina cracking catalyst is plotted against hafnia content of the catalyst. The cracking selectivity unexpectedly increased with an increase in hafnia content. This trend is rather unexpected since it is opposite to the results exhibited by silica-alumina and silica-zirconia types of cracking catalysts wherein cracking selectivity decreases with an increase in metal oxide content of the catalyst.

It will be understood that the above description is merely illustrative of preferred embodiments of the invention, of which many variations may be made by those skilled in the art without departing from the spirit thereof.

We claim:
1. A process for preparing a catalytic composite of silica and hafnia which comprises reacting a water-soluble hafnium compound and a silicate to effect formation of a gelable sol consisting essentially of silica and hafnia characterized by a pH in excess of 6 and a hafnia content, on a dry solids basis, of between about 1 and about 30 percent by weight, permitting the said sol to set forming a silica-hafnia gel, reducing the pH of said gel to below 5 and maintaining the gel under such conditions of reduced pH while in contact with an aqueous medium at a temperature in the approximate range of 150 to 220° F. for a period of at least about 1 hour under conditions of substantially atmospheric pressure, thereafter washing the gel free of soluble matter, drying and calcining.

2. A process for preparing a catalytic composite of silica and hafnia which comprises reacting a water-soluble hafnium compound and an alkali metal silicate to effect formation of a gelable sol consisting essentially of silica and hafnia characterized by a pH in excess of 6 and a hafnia content, on a dry solids basis, of between about 2 and about 25 percent by weight, permitting the said sol to set forming a silica-hafnia gel, reducing the pH of said gel to below 3.5 and maintaining the gel under such condition of reduced pH while in contact with an aqueous medium at a temperature in the approximate range of 150 to 220° F. for at least about 2 hours under conditions of substantially atmospheric pressure, thereafter washing the gel free of soluble matter, drying and calcining.

3. A process for preparing a catalytic composite of silica and hafnia which comprises reacting in aqueous solution, a water-soluble hafnium compound and an alkali metal silicate to effect formation of a gelable hydrosol consisting essentially of silica and hafnia characteriezed by a pH in excess of 6 but not greater than 11 and a hafnia content, on a dry solids basis, of between about 1 and about 30 percent by weight, permitting the said hydrosol to set forming a silica-hafnia hydrogel, reducing the pH of said hydrogel to below 5 but in excess of 1 and maintaining the hydrogel under such conditions of reduced pH while in contact with an aqueous medium at a temperature in the approximate range of 150 to 220° F. for at least about 1 hour under conditions of substantially atmospheric pressure, thereafter washing the gel free of soluble matter, drying and calcining.

4. A process for preparing a catalytic composite of silica and hafnia which comprises reacting in aqueous solution a water-soluble hafnium salt of a mineral acid and sodium/silicate to effect formation of a gelable hydrosol consisting essentially of silica and hafnia characterized by a pH in excess of 6 and a hafnia content, on a dry solids basis, of between about 2 and about 25 percent by weight, permitting the said hydrosol to set forming a silica hafnia hydrogel, reducing the pH of said hydrogel to within the approximate range of 1 to 3.5 and maintaining the hydrogel under such conditions of reduced pH while in contact with an aqueous acidic medium at a temperature in the approximate range of 175 to 200° F. for a period of about 2 to about 72 hours under conditions of substantially atmospheric pressure, thereafter washing the gel free of soluble matter, drying and calcining.

5. A process for preparing a catalytic composite of silica and hafnia which comprises reacting in aqueous solution, hafnium sulfate and sodium silicate to effect formation of a gelable hydrosol consisting essentially of silica and hafnia characterized by a pH in excess of 6 but not greater than 11, and a hafnia content, on a dry solids basis, of between about 2 and about 25 percent by weight, permitting the said hydrosol to set forming a silica hafnia hydrogel, reducing the pH of said hydrogel to below 5 but in excess of 1 and maintaining the hydrogel under such conditions of reduced pH while in contact with an aqueous acidic medium at a temperature in the approximate range of 175 to 200° F. for a period of between about 2 and about 72 hours under conditions of substantially atmospheric pressure thereafter washing the gel free of soluble matter, drying and calcining at a temperature between about 800 and about 1800° F.

6. A process for the conversion of hydrocarbons which comprises contacting hydrocarbon vapor at conversion conditions of temperature and pressure with a catalyst consisting essentially of silica and hafnia and having a hafnium content of between about 1 and about 30 percent by weight, prepared by a process which comprises reacting a water-soluble hafnium compound and a silicate to effect formation of a gelable sol consisting essentially of silica and hafnia characterized by a pH in excess of 6 and a hafnia content, on a dry solids basis, of between about 1 and about 30 percent by weight, permitting the said sol to set forming a silica-hafnia gel, reducing the pH of said gel to below 5 and maintaining the gel under such conditions of reduced pH while in contact with an aqueous medium at a temperature in the approximate range of 150 to 220° F. for a period of at least about 7. A process for the conversion of hydrocarbons which comprises contacting hydrocarbon vapor at conversion conditions of temperature and pressure with a catalyst consisting essentially of silica and hafnia and having a hafnium content of between about 1 and about 30 percent by weight, prepared by a process which comprises reacting in aqueous solution, a water-soluble hafnium compound and an alkali metal silicate to effect formation of a gelable hydrosol consisting essentially of silica and hafnia characterized by a pH in excess of 6 but not greater than 11 and a hafnium content, on a dry solids basis, of between about 1 and about 30 percent by weight, permitting the said hydrosol to set forming a silica-hafnia hydrogel, reducing the pH of said hydrogel to below 5 but in excess of 1 and maintaining the hydrogel under such conditions of reduced pH while in contact with an aqueous medium at a temperature in the approximate range of 150 to 220° F. for at least about 1 hour under conditions of substantially atmospheric pressure, thereafter washing the gel free of soluble matter, drying and calcining.

8. A process for the conversion of hydrocarbons which comprises contacting hydrocarbon vapor at conversion conditions of temperature and pressure with a catalyst consisting essentially of silica and hafnia having a hafnium content of between about 2 and about 25 percent by weight, prepared by reacting in aqueous solution, a water-soluble hafnium salt of a mineral acid and sodium silicate to effect formation of a gelable hydrosol consisting essentially of silica and hafnia characterized by a pH in excess of 6, and a hafnia content, on a dry solids basis, of between about 2 and about 25 percent by weight, permitting the said hydrosol to set forming a silica hafnia hydrogel, reducing the pH of said hydrogel to within the approximate range of 1 to 3.5 and maintaining the hydrogel under such conditions of reduced pH while in contact with aqueous acidic medium at a temperature within the approximate range of 150 to 220° F. for a period of about 2 to about 72 hours under conditions of substantially atmospheric pressure, thereafter washing the gel free of soluble matter, drying and calcining.

9. A process for cracking a heavy petroleum oil to lighter materials boiling in the range of gasoline which comprises contacting said oil at catalytic cracking conditions with a catalyst consisting essentially of silica and hafnia having a hafnia content of between about 2 and about 25 percent by weight, prepared by reacting in aqueous solution, hafnium sulfate and sodium silicate to effect formation of a gelable hydrosol consisting essentially of silica and hafnia characterized by a pH in excess of 6 but not greater than 11 and a hafnium content, on a dry solids basis, of between about 2 and about 25 percent by weight, permitting the said hydrosol to set forming a silica-hafnia hydrogel, reducing the pH of said hydrogel to below 5 but in excess of 1 and maintaining the hydrogel under such conditions of reduced pH while in contact with an aqueous acidic medium at a temperature within the approximate range of 175 to 200° F. for a period of between about 2 and about 72 hours under conditions of substantially atmospheric pressure, thereafter washing the gel free of soluble matter, drying and calcining at a temperature between about 800 and about 1800° F.

10. A hydrocarbon conversion catalyst consisting essentially of silica and hafnia having a hafnium content of between about 1 and about 30 percent, prepared by reacting a water-soluble hafnium compound and a silicate to effect formation of a gelable sol, consisting essentially of silica and hafnia characterized by a pH in excess of 6, and a hafnia content, on a dry solids basis, of between about 1 and about 30 percent by weight, permitting the said sol to set forming a silica hafnia gel, reducing the pH of said gel to below 5 and maintaining the gel under such conditions of reduced pH while in contact with an aqueous medium at a temperature in the approximate range of 150 to 220° F. for a period of at least about 1 hour under conditions of substantially atmospheric pressure, thereafter washing the gel free of soluble matter, drying and calcining.

11. A hydrocarbon conversion catalyst consisting essentially of silica and hafnia having a hafnium content of between about 1 and about 30 percent by weight, prepared by reacting in aqueous solution, a water-soluble hafnium compound and an alkali metal silicate to effect formation of a gelable hydrosol consisting essentially of silica and hafnia characterized by a pH in excess of 6 but not greater than 11, and a hafnia content on a dry solids basis, of between about 1 and about 30 percent by weight, permitting the said hydrosol to set forming a silica-hafnia hydrogel, reducing the pH of said hydrogel to below 5 but in excess of 1 and maintaining the hydrogel under such conditions of reduced pH while in contact with an aqueous medium at a temperature in the approximate range of 150 to 220° F. for at least about 1 hour under conditions of substantially atmospheric pressure, thereafter washing the gel free of soluble matter, drying and calcining.

12. A hydrocarbon conversion catalyst consisting essentially of silica and hafnia having a hafnia content of between about 2 and about 25 percent by weight, prepared by reacting in aqueous solution a water-soluble hafnium salt of a mineral acid and sodium silicate to effect formation of a gelable hydrosol consisting essentially of silica and hafnia characterized by a pH in excess of 6 and a hafnia content, on a dry solids basis, of between about 2 and about 25 percent by weight, permitting the said hydrosol to set forming a silica-hafnia hydrogel, reducing the pH of said hydrogel to within the approximate range of 1 to 3.5 and maintaining the hydrogel under such conditions of reduced pH while in contact with an aqueous acidic medium at a temperature within the approximate range of 175 to 200° F. for a period of about 2 to about 72 hours under conditions of substantially atmospheric pressure, thereafter washing the gel free of soluble matter, drying and calcining.

References Cited in the file of this patent

UNITED STATES PATENTS

| | | |
|---|---|---|
| 2,124,583 | Morrell | July 26, 1938 |
| 2,580,641 | Bates et al. | Jan. 1, 1952 |